No. 653,443. Patented July 10, 1900.
R. W. ENNIS.
CAR BRAKE.
(Application filed Dec. 27, 1899.)
(No Model.) 2 Sheets—Sheet 1.
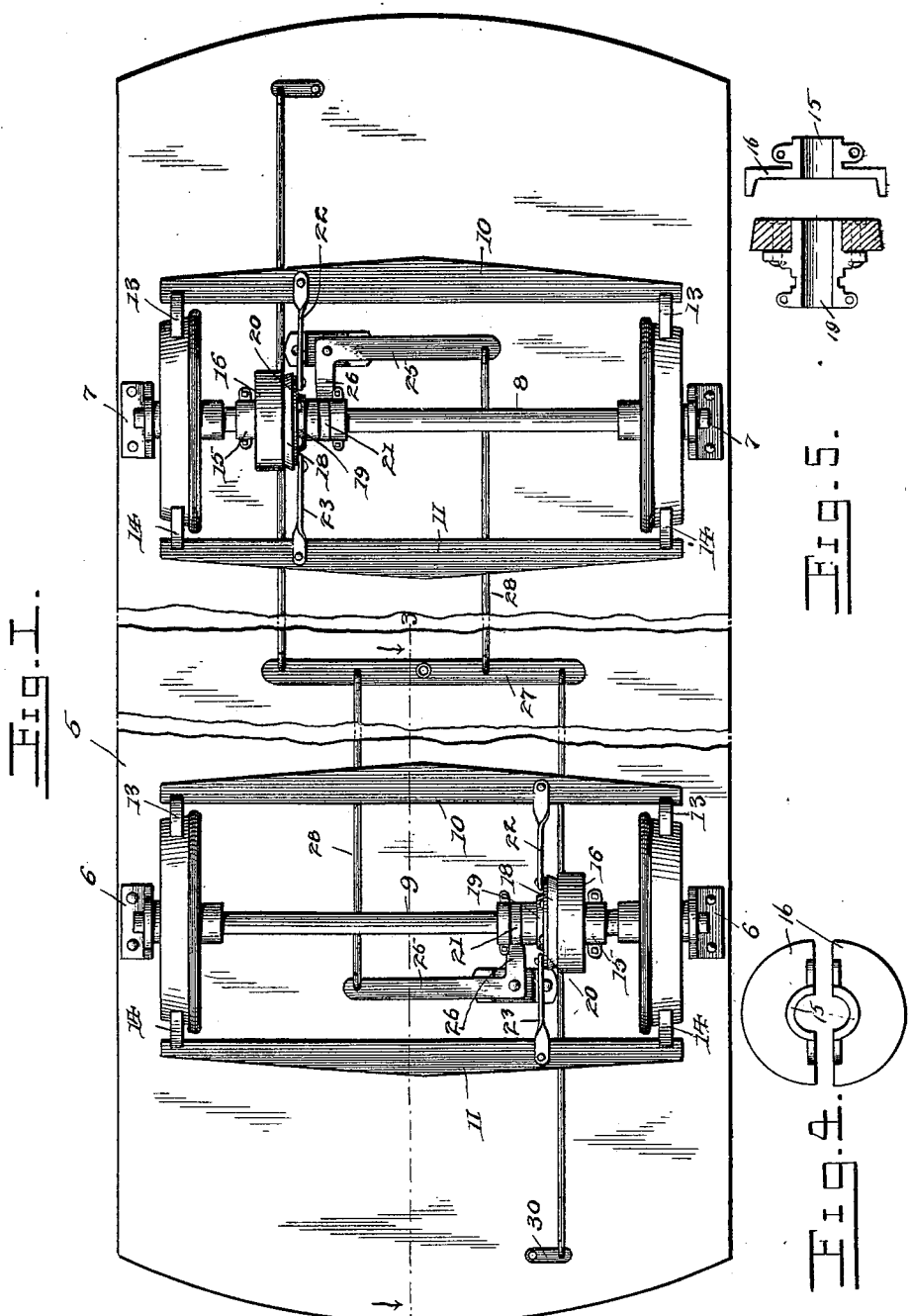

No. 653,443. Patented July 10, 1900.
R. W. ENNIS.
CAR BRAKE.
(Application filed Dec. 27, 1899.)
(No Model.)
2 Sheets—Sheet 2.
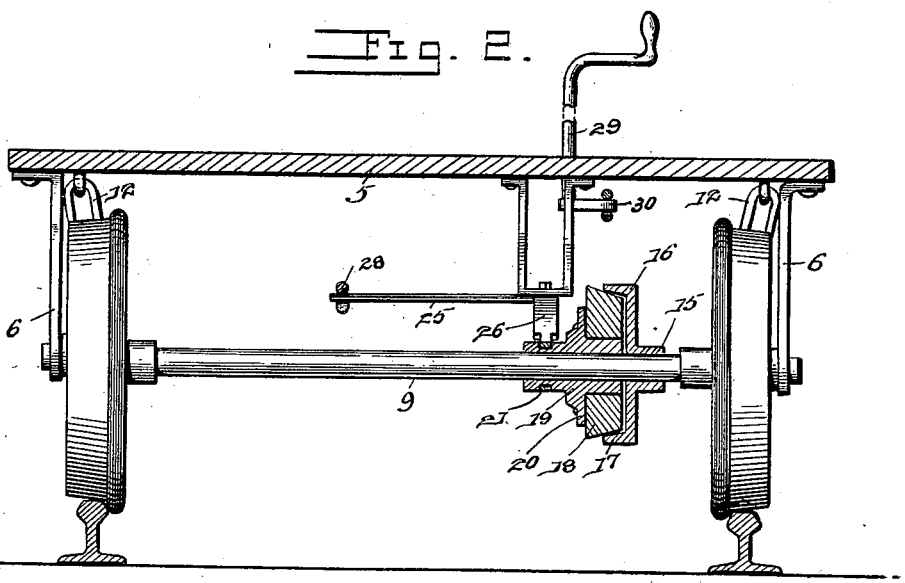
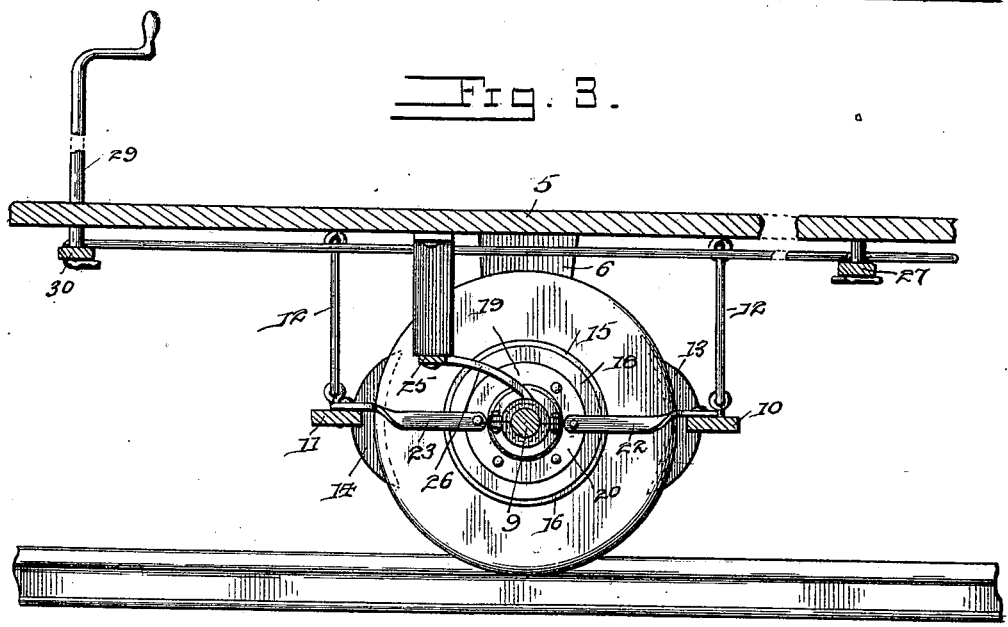
Witnesses
F. E. Alden.
Geo. H. Chandler.
Richard W. Ennis Inventor
By his Attorneys,
C. A. Snow & Co.

UNITED STATES PATENT OFFICE.

RICHARD WESLEY ENNIS, OF BUFFALO, NEW YORK.

CAR-BRAKE.

SPECIFICATION forming part of Letters Patent No. 653,443, dated July 10, 1900.

Application filed December 27, 1899. Serial No. 741,745. (No model.)

*To all whom it may concern:*

Be it known that I, RICHARD WESLEY ENNIS, a citizen of the United States, residing at Buffalo, in the county of Erie and State of New York, have invented a new and useful Car-Brake, of which the following is a specification.

This invention relates to car-brakes, and particularly to that class of brakes that are hand-operated, although the structure is equally applicable to brakes operated in any other manner, the object of the invention being to provide a construction in which the brakes are directly operated from the axle of the wheels and are thrown into and out of their operative relation to the axle by hand means.

The invention comprises brake-beams suspended from the body of the car and having shoes adapted for engagement with the wheels of the car. A friction-clutch is mounted upon the wheel-axle, one member of the clutch being fixed to the axle, while the other is mounted loosely upon the axle and adapted for longitudinal movement with respect thereto. The loosely-mounted member has link connections with the brake-beams, so that when this movable member is engaged with the fixed member the rotation of the axle with the wheels will act to move the loose element or member and draw the links to engage the shoes with the wheels.

In the drawings forming a portion of this specification, and in which similar numerals of reference designate like and corresponding parts in the several views, Figure 1 is a bottom plan view of a car having two pairs of wheels equipped with brake mechanism of the present invention. Fig. 2 is a section taken transversely of the car-platform and through the clutch mechanism, the adjacent wheels and the axle thereof being shown in elevation. Fig. 3 is a section on line 3 3 of Fig. 2 and showing the means for operating the movable member of the clutch. Fig. 4 is a side elevation showing one side of the fixed clutch element with the parts thereof separated. Fig. 5 is a plan view showing parts of the clutch and with the wooden friction-drum in section.

Referring now to the drawings, 5 represents the body or platform of a car of any style and to which are fixed pedestals 6 and 7, in which are journaled the front and rear axles 8 and 9, respectively, these axles having wheels fixed thereon in the usual manner. While in the present construction the pedestals are shown of a simple form, it will be readily understood, of course, that the invention equally applies to a construction in which the wheels are connected with the car in any other manner.

The brake mechanism of both pairs of wheels is the same, and therefore a description of one mechanism applies equally to the other, and as illustrated each of these mechanisms comprises a brake-beam 10 and 11, arranged at opposite sides of the wheels and hung from the body of the car by means of hangers 12 or in any other suitable manner. Each of the brake-beams is provided with brake-shoes 13 and 14, respectively, which are adapted to be moved into and out of engagement with their respective wheels as the brake-beams are swung in corresponding directions.

In order to move the brake-beams, and therewith the brake-shoes, a clutch element 15 is fixed to the axle 8, this clutch member being in the form of a disk 16, having a flange 17 upon one face and at the periphery thereof, the inner wall of this flange being tapered in the direction of the disk. Coöperating with this fixed element 15 is a second frusto-conical element 18, of wood or other suitable material, and which is fixed upon a sleeve 19, loosely mounted upon the axle 8 and adapted for both rotatable and slidable movement thereon. The sleeve 19 has a flange 20, which bears against the outer face of the element 18, and at the opposite sides of said element the sleeve is provided with a peripheral groove 21. Links or bars 22 and 23 are secured at one end to the brake-beams 10 and 11, respectively, while their opposite ends are eccentrically pivoted to the flange 20, and thus when an attempt is made to rotate the element or member 18 the links 22 and 23 are drawn and correspondingly move the beams 10 and 11 to engage the shoes 13 and 14 with the treads of the wheels. If this movable member of the clutch be rotated in the opposite direction, it will first act to swing the brake-beams outwardly, and if the movement of the member be continued it will subsequently act to draw the beams inwardly and reëngage the shoes with the wheels.

To oscillate the movable member 18 in the manner above described, it is only necessary to frictionally engage it with the fixed member 15, and for this purpose an angular lever 25 is provided with a yoke 26, which engages the groove 21, whereby as the lever is oscillated or rocked the member 18 will be swung into and out of engagement with the member 15, the method of connection of the lever to the movable member being such as to permit partial rotation of the movable member with the shaft through the medium of the fixed member. The levers 25, which are approximately L-shaped, are fulcrumed at their angles on brackets which depend from the car-body, and the short arms of the levers 25 are curved downward, as clearly shown in Fig. 3. These levers 25 are connected at their power ends with a common lever 27, at opposite sides of the fulcrum thereof, through the medium of connecting-rods 28. A crank 29 is mounted at each end of the car, and at the lower end of the shaft of each crank is a crank-arm 30, which is connected with the lever 27, on the same side of the fulcrum of the lever as the connecting-rod which connects the lever 27 with the opposite brake mechanism. With this construction if either of the cranks 29 be operated in one direction the lever 27 will be moved to throw both elements 18 into engagement with the adjacent fixed elements of the clutches and the movable elements will be operated to draw the brake-beams, with the shoes, into engagement with the wheels of the car. It will thus be seen that while the brake-operating mechanism is thrown into and out of the position to cause coöperation of its parts by manipulation of the hand-crank, the braking operation is actually effected through the medium of the wheels themselves, thus securing a maximum effect with the expenditure of a minimum of energy by the operator.

It will of course be understood that in practice a single mechanism may be employed on a car, and that where the structure is used in connection with bogie-trucks the brake-beams may be suspended from the truck-frames in the usual way. Various other modifications may of course be made without departing from the spirit of the invention.

In practice it is found preferable to form the clutch elements in a manner that will permit their ready application to and removal from the wheel-axles, and for this purpose the fixed clutch element 16 comprises two semicircular parts having corresponding perforated ears, with which are engaged clamping-bolts, as illustrated in Fig. 1. The slidable clutch element is similarly formed, and the wooden clutch-drum 18 has its parts so joined as to break joints with the sleeve to which it is fixed. The result is a rigid structure and one which may be easily and quickly attached and removed, as will be readily understood.

What is claimed is—

1. In a brake mechanism, the combination with an axle and the wheels mounted thereon, of brake-shoes adapted for engagement with the wheels, a clutch comprising a member fixed to the axle and a member mounted loosely upon the axle, bars connected with the brake-shoes and eccentrically pivoted to the loose member, and means for moving the loose member into and out of operative relation to the fixed member, substantially as described.

2. In a brake mechanism, the combination with a rotatable body and brake-shoes adapted for movement into and out of operative relation to the rotatable body, of a clutch member fixed to the rotatable body, a movable clutch member adapted for movement into and out of engagement with the fixed clutch member, bars connected with the brake-shoes and eccentrically pivoted to the loose member, and means for throwing the movable member into and out of operative relation to the fixed clutch member, substantially as described.

3. In a brake mechanism, the combination with an axle and wheels fixed thereto, of brake-shoes adapted for engagement with the wheels, a clutch member having fixed relation to the wheels, a second clutch member adapted for movement into and out of operative relation to the fixed clutch member, means for moving the movable clutch member, and bars connected with the brake-shoes and eccentrically pivoted to the loose member, substantially as described.

4. In a brake mechanism, the combination with an axle and wheels fixed thereto, of brake-shoes adapted to engage the wheels, a clutch member fixed to the axle, a second clutch member mounted loosely upon the axle and adapted for slidable movement thereon into and out of engagement with the fixed member, a lever operatively connected with the movable member for moving it along the axle, means for operating said lever, brake-beams for the brake-shoes, and bars connected at their outer ends to the brake-beams and eccentrically pivoted at their inner ends to the movable clutch member, substantially as described.

5. The combination with a vehicle, axles, wheels fixed to the axles, of brake-beams located at opposite sides of the axles and provided with brake-shoes for engaging the wheels, clutch members fixed to the axles, sliding clutch members loosely mounted on the axles and slidably connected therewith, links connected with the brake-beams and eccentrically pivoted to the movable clutch members, the L-shaped levers fulcrumed at their angles and having short arms curved downward and connected with the sliding members, the lever 27 fulcrumed between its ends and connected with the long arms of the L-shaped levers, and operating mechanism connected with the lever 27, substantially as described.

In testimony that I claim the foregoing as my own I have hereto affixed my signature in the presence of two witnesses.

RICHARD WESLEY ENNIS.

Witnesses:
   J. S. WAKEFIELD,
   JOHN ENNIS.